(12) United States Patent
Uduki

(10) Patent No.: US 8,368,982 B2
(45) Date of Patent: Feb. 5, 2013

(54) SCANNING OPTICAL APPARATUS

(75) Inventor: Kazuo Uduki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 12/121,492

(22) Filed: May 15, 2008

(65) Prior Publication Data

US 2008/0291515 A1 Nov. 27, 2008

(30) Foreign Application Priority Data

May 24, 2007 (JP) ................................. 2007-137946

(51) Int. Cl.
*G02B 26/08* (2006.01)
(52) U.S. Cl. .................................................. 359/198.1
(58) Field of Classification Search .... 359/196.1–226.3; 347/250–264
See application file for complete search history.

(56) References Cited

U.S. PATENT DOCUMENTS

| | | | | |
|---|---|---|---|---|
| 5,159,193 | A * | 10/1992 | Shiraishi et al. | 250/236 |
| 6,381,428 | B1 * | 4/2002 | Yamamoto et al. | 399/116 |
| 6,678,493 | B2 * | 1/2004 | Maeyama et al. | 399/302 |
| 7,450,146 | B2 * | 11/2008 | Sakaue et al. | 347/263 |
| 2003/0090563 | A1 * | 5/2003 | Tomita et al. | 347/245 |
| 2005/0093968 | A1 * | 5/2005 | Iwamoto | 347/238 |
| 2006/0187513 | A1 | 8/2006 | Ohsugi | |

FOREIGN PATENT DOCUMENTS

| | | |
|---|---|---|
| JP | 2006078903 A | 3/2006 |
| JP | 2006154091 A | 6/2006 |
| JP | 2006-234977 A | 9/2006 |
| JP | 2006234977 A | 9/2006 |
| JP | 2006349925 A | 12/2006 |

* cited by examiner

*Primary Examiner* — Jennifer L. Doak
(74) *Attorney, Agent, or Firm* — Canon U.S.A., Inc. IP Division

(57) ABSTRACT

A scanning optical apparatus includes a deflection element configured to deflect a laser beam emitted from a light source for scanning, a mirror member configured to directly reflect the laser beam deflected by the deflection element toward a surface to be scanned, and an optical box configured to house the deflection element and the mirror member. The optical box includes a bottom plate portion and a sidewall portion that encloses the bottom plate portion. The scanning optical apparatus further includes a plate-shaped connection portion configured to connect an opening surface of the optical box that faces the bottom plate portion from one side to the other side of the sidewall portion. The connection portion is provided at a position where it does not overlap with the mirror member in a direction orthogonal to the bottom plate portion.

10 Claims, 3 Drawing Sheets

SCANNING OPTICAL APPARATUS

BACKGROUND OF THE INVENTION

1. Field of the Invention

The present invention relates to a scanning optical apparatus that is used in image forming apparatuses such as an electrophotographic copying machine and a laser printer.

2. Description of the Related Art

In a scanning optical apparatus that is used in an image forming apparatus such as an electrophotographic copying machine and a laser printer, generally, an optical beam emitted from a light source is deflected by a deflector and is condensed by an imaging optical system such as an f-theta lens to form a beam spot on a photosensitive drum. The scanning optical apparatus scans the photosensitive drum surface with the beam spot.

A laser beam deflected and scanned within an optical box forms an image using an optical lens, and the image is reflected by reflecting mirrors toward the photo sensitive drum. In the process, if a relative position of the optical lens is deviated by a vibration or deformation of the optical box due to temperature change, an illumination position of the laser beam toward the drum surface is deviated. A positional deviation of images is roughly classified into a parallel deviation, an oblique deviation, and a quadratic curve deviation.

Therefore, the optical box is required for example, to have lowest resonance frequency which is more than a frequency of a drive source, to enhance resistance to a vibration, not to have a natural frequency near a frequency of a drive source, or not to generate deformation in directions other than a linear expansion direction if environmental temperatures vary.

At the same time, when a small deformation is generated in a body frame, it is necessary to ensure adequate static stiffness which does not generate in the optical box deformation greater than the deformation in the body frame.

However, within the optical box, a deflection motor is disposed, and many optical components such as lenses and reflection mirrors are disposed around the deflection motor. Further, optical paths in each optical system need to be ensured in the optical box, so that areas for forming rib structure for reinforcement are limited.

To solve the problem, for example, Japanese Patent Application Laid-Open No. 2006-234977 discusses providing a reinforcing member for connecting ribs provided around a deflection motor on a center side of an optical box as a method to increase strength of a scanning optical apparatus other than providing ribs within the optical box.

The structure discussed in Japanese Patent Application Laid-Open No. 2006-234977 is effective to cope with a self-excited vibration due to rotation of the deflection motor. However, the structure is not sufficient to secure a vibration-proof performance against an external vibration and to reduce torsion of a frame of the optical box that causes positional deviation of an optical element.

To solve the problem, as a reinforcing member, a covering member can be provided that covers an entire opening surface facing a base plate of a scanning optical apparatus. However, such a covering member has the following problem. That is, an optical axis needs to be adjusted to a light flux emitted from the optical box after the assembly of the optical box is completed. However, adjustment of the optical axis is not physically possible in the state that the covering member is mounted. It is conceivable that the covering member is removed to perform the adjustment and then mounted on the apparatus after completion of the adjustment. However, the high-stiffness covering member mounted over the entire optical box upper surface will cause deformation of the optical box due to fitting of the optical box to the shape of the covering member if the covering member has even a small problem with accuracy. Accordingly, the adjusted optical axis can be deviated.

SUMMARY OF THE INVENTION

The present invention is directed to a scanning optical apparatus that can adjust an optical axis emitted from a scanning optical box while strength of an optical box upper surface portion of the scanning optical apparatus is increased. Further, the present invention is directed to a scanning optical apparatus that can reduce deviation of an optical axis emitted from a scanning optical box if a covering member that covers an upper surface of the optical box of the scanning optical apparatus is provided.

According to an aspect of the present invention, a scanning optical apparatus includes a deflection member configured to deflect a laser beam emitted from a light source; a mirror member configured to reflect the laser beam deflected by the deflection member toward a surface to be scanned; an optical box configured to house the deflection member and the mirror member, wherein the optical box includes a bottom plate portion and a side wall portion that encloses the bottom plate portion; and a covering portion configured to cover a part of an area of the optical box that faces the bottom plate portion so as to reinforce the optical box, wherein the covering portion is provided at a position where it does not overlap with the mirror member in a direction orthogonal to the bottom plate portion.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EXEMPLARY EMBODIMENTS

Various exemplary embodiments, features, and aspects of the invention will be described in detail below with reference to the drawings.

Figure 1:
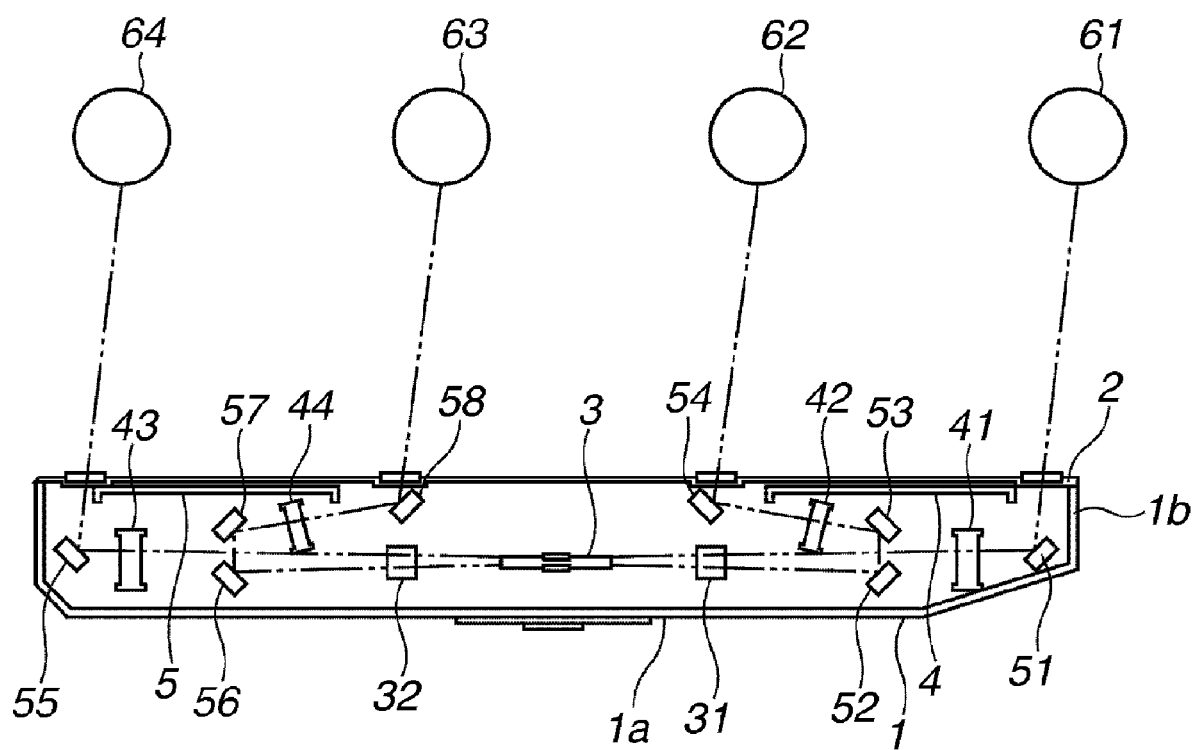
FIG. 1 is a cross sectional view illustrating an example structure of a scanning optical apparatus according to an exemplary embodiment of the present invention.
Figure 2:
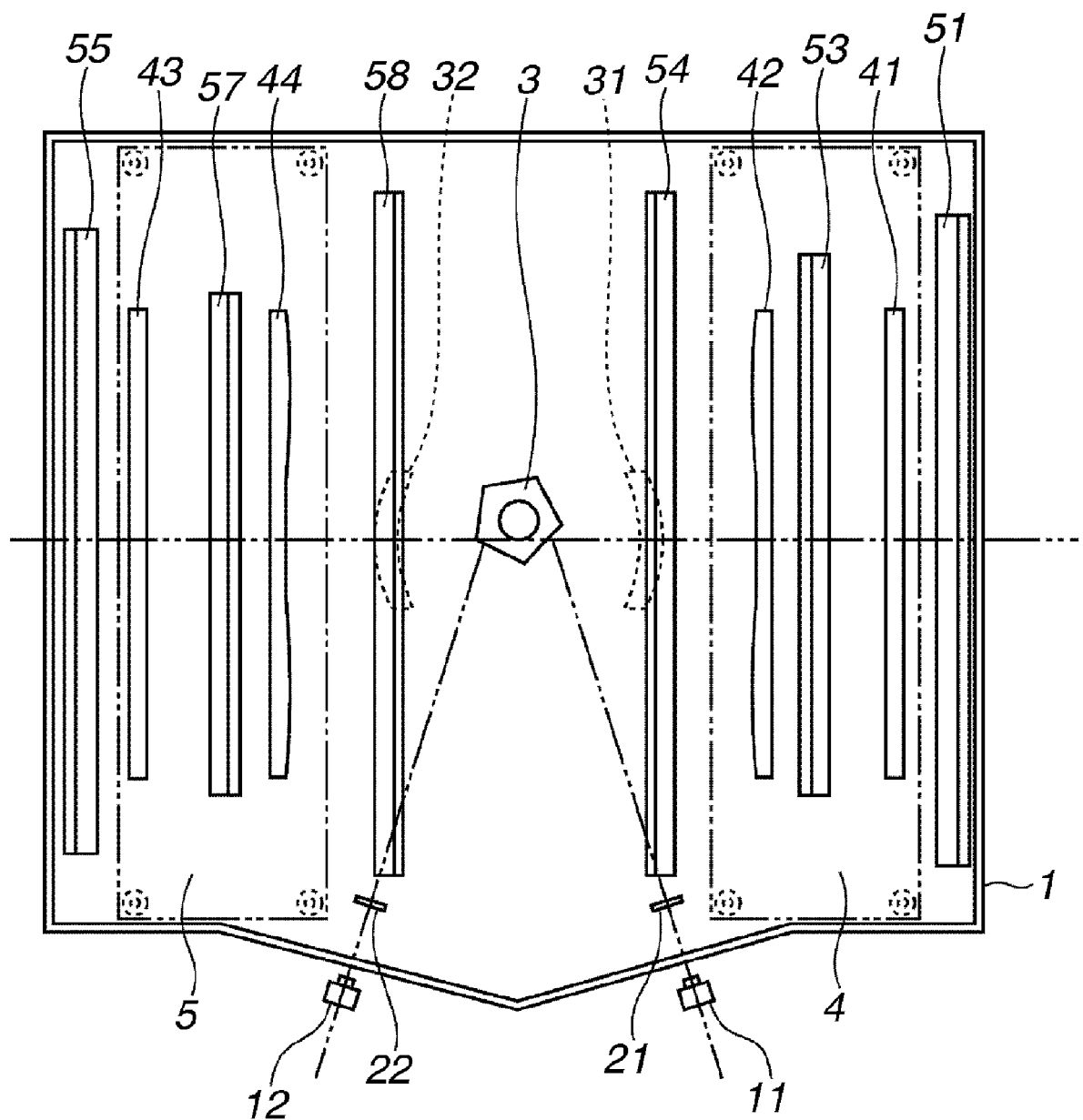
FIG. 2 is a plan view illustrating an example structure of the scanning optical apparatus according to the exemplary embodiment of the present invention.
Figure 3:
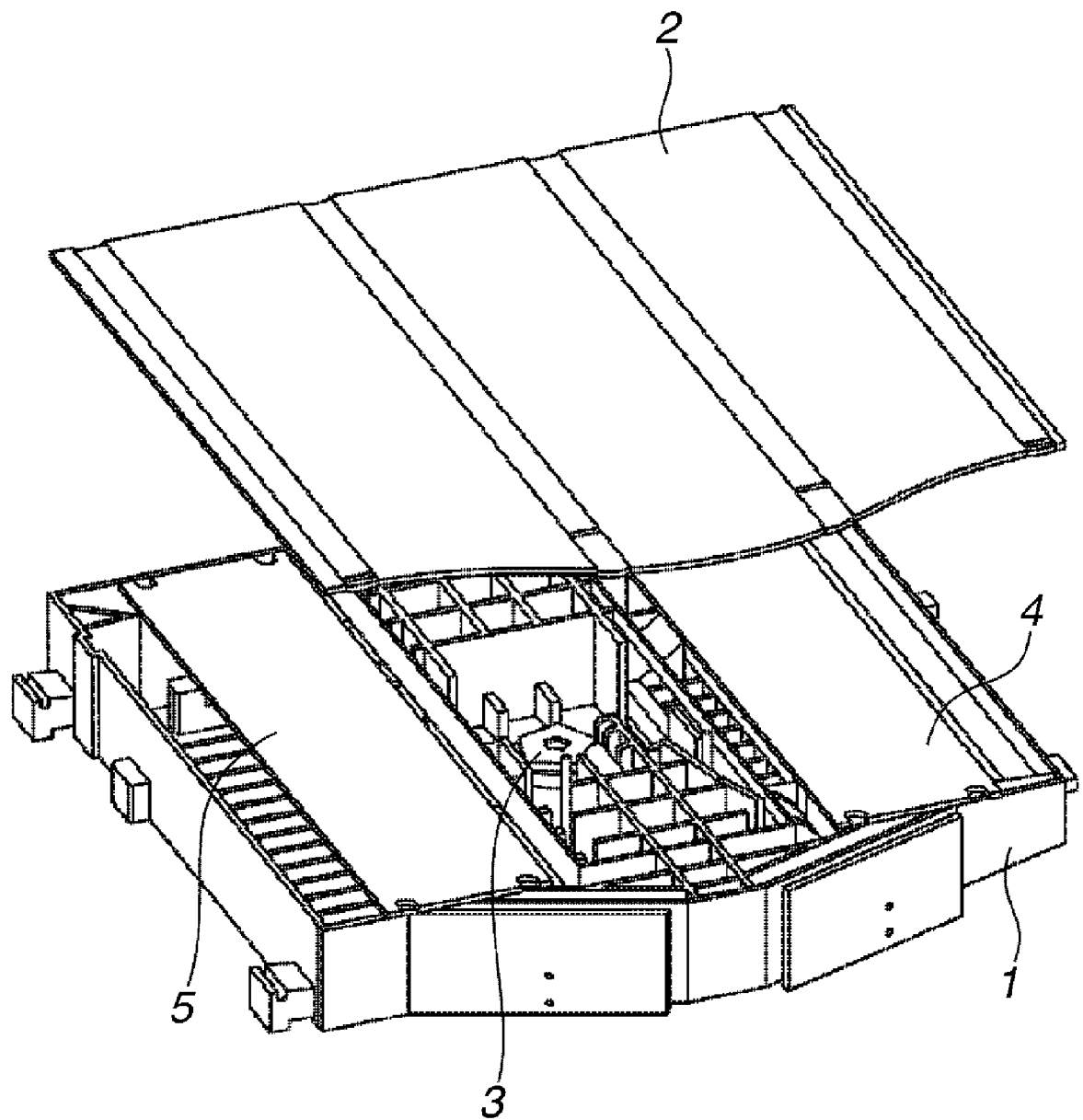
FIG. 3 is an exploded perspective view illustrating an example structure of the scanning optical apparatus according to the exemplary embodiment of the present invention.

FIGS. 1 to 3 illustrate example structures of a scanning optical apparatus according to an exemplary embodiment of the present invention. FIG. 1 is a cross sectional view illustrating mainly a portion disposed after a deflector in a scanning optical apparatus mounted on a tandem type color image forming apparatus that uses four photosensitive drums. FIG. 2 is a plan view illustrating positions of the deflector, imaging lenses, and reflecting mirrors from light sources in the scanning optical apparatus in a state that a cover is removed. FIG. 3 is an exploded perspective view illustrating a structure of the scanning optical apparatus.

The scanning optical apparatus includes an optical box 1, a cover 2, and reinforcing members 4 and 5 as a housing. The optical box 1 includes a bottom plate 1a as a bottom part (bottom plate portion), and a sidewall 1b as a sidewall portion provided around the bottom plate 1a.

The reinforcing member 4 that functions as a connection portion is disposed, viewed from a direction orthogonal to the bottom plate 1a, at a position that substantially covers second imaging lenses 41 and 42 for black K and cyan C. The reinforcing member 4 is screwed to a fastening shape part formed on the optical box 1. The imaging lenses 41 and 42 for black K and cyan C are disposed on a right side of a deflector 3 provided in the optical box 1. Similarly, the reinforcing member 5 is disposed at a position that substantially covers second imaging lenses 43 and 44 for magenta M and yellow Y that are disposed on a left side of the deflector 3.

In the present exemplary embodiment, the optical box 1 is formed of a polycarbonate-based glass-reinforced plastic by injection molding. Similarly, the reinforcing members 4 and 5 are components formed of the same material by injection molding. It is not necessary to form the reinforcing members using the same material as the optical box. However, to prevent thermal deformation due to temperature change, it is desirable that linear expansion coefficients of the reinforcing members are equivalent to the optical box.

A light source portion includes two light sources 11 that correspond to black K and cyan C and two light sources 12 that correspond to magenta M and yellow Y. Each of the light sources has grazing-incidence angles in Z direction and is disposed such that laser beam fluxes from the light source intersect in deflection surfaces of the deflector 3. The light source portion is housed in the optical box 1 together with four collimator lenses (not shown) that collimate each of the laser beams. Composite cylindrical lenses 21 and 22 that correspond to two light sources respectively are provided to condense the laser beams on a polygonal mirror in a long linear shape in a main scanning direction. The deflector 3 that includes a brushless motor having the polygonal mirror scans with each of laser fluxes corresponding to black K and cyan C on the right side of the deflector 3, and scans with each of laser fluxes corresponding to magenta M and yellow Y on the left side of the deflector 3. The laser fluxes corresponding to each color deflected by the deflector 3 are transmitted halfway to optical systems that are independently provided for each fluxes and condensed at predetermined positions on photosensitive drums 61, 62, 63, and 64 that function as image carriers of each color. A scanning optical system includes first imaging lenses 31 and 32, the second imaging lenses 41, 42, 43, and 44, and reflecting mirrors 51, 52, 53, 54, 55, 56, 57, and 58. The scanning optical system is provided on optical paths of the laser fluxes corresponding to each color. The first imaging lenses 31 and 32 and the second imaging lenses 41, 42, 43, and 44 perform f-theta correction of scanning light. The second imaging lenses 41, 42, 43, and 44 mainly perform image formation in a sub scanning direction. The first imaging lenses 31 and 32 commonly transmit two laser fluxes emitted from each light source. The second imaging lenses 41, 42, 43, and 44 separately transmit each laser flux that has passed through the first imaging lenses 31 and 32.

The reinforcing members 4 and 5 are provided on an upper surface portion (opening surface side) of the optical box 1 that faces the bottom plate 1a. The reinforcing members 4 and 5 are plate-shaped connection parts that make connection from one side to the other side of the sidewall 1b. The reinforcing members 4 and 5 are provided such that they do not overlap with the reflecting mirrors 51, 54, 55, and 58 when viewed from the direction orthogonal to the bottom plate 1a of the optical box 1. The reinforcing members 4 and 5 are connected along longitudinal directions of the reflecting mirrors 51, 54, 55, and 58, and are partially connected with respect to directions orthogonal to the longitudinal directions of the reflecting mirrors 51, 54, 55, and 58.

Such a structure enables to adjust reflection angles of the reflecting mirrors 51, 54, 55, and 58 on which the laser fluxes toward the image carriers of each color are finally folded after assembly is completed. That is, positions of the mirrors that directly reflect the laser fluxes to the image carriers corresponding to each color can be adjusted.

After the positional adjustment of the reflecting mirrors 51, 54, 55, and 58 is completed, the cover 2 for dust prevention is mounted as a covering member to cover at least an opening part that is not covered by the reinforcing members 4 and 5. In the exemplary embodiment, the cover 2 is mounted over the reinforcing members 4 and 5 to cover an entire upper surface of the optical box 1.

In FIGS. 1 and 2, the light source 11 includes two independent luminous points that are separately provided at an appropriate distance in a vertical direction. Each of the luminous points corresponds to laser fluxes of black K and cyan C. The two laser fluxes obliquely emitted from the two luminance points in directions approaching each other are respectively collimated by collimator lenses (not shown) that are independently disposed on each optical axis. The collimator lenses are adjusted and fixed at positions that ensure an illumination position and a focusing position of each laser flux. The two collimated laser fluxes are condensed in the sub scanning direction by the composite cylindrical lens 21 that has a twin-lens corresponding to the obliquely emitted two laser fluxes, and forms a linear image at a single reflection point on the polygonal mirror of the deflector 3.

The laser fluxes reflected on the reflecting surface of the polygonal mirror surface are deflected for scanning. The laser fluxes are obliquely reflected in an upside-down relation on the reflecting surface and travel toward the first imaging lens 31 that is an f-theta lens. The laser fluxes for black K and cyan C commonly pass through the first imaging lens 31 and are f-theta corrected. Then the laser flux for black K passes through the second imaging lens 41, and travels toward the reflecting mirror 51. The optical path of the laser flux for black K is turned at the reflecting mirror 51, and an image is formed on the photosensitive drum 61 for black K.

The laser flux for cyan C is folded on the reflecting mirrors 52 and 53, and travels through the second imaging lens 42 toward the reflecting mirror 54. The optical path of the laser flux for cyan C is turned at the reflecting mirror 54, and an image is formed on the photosensitive drum 62 for cyan C.

Similarly, the light source 12 includes two independent luminous points that are separately provided at an appropriate distance in a vertical direction. The luminous points correspond to laser fluxes of magenta M and yellow Y respectively. The two laser fluxes obliquely emitted from the two luminance points in directions approaching each other are respectively collimated by the collimator lenses (not shown) that are independently disposed on each optical axis. The collimator lenses are adjusted and fixed at positions that ensure an illumination position and a focusing position of each laser flux. The two collimated laser fluxes are condensed in the sub scanning direction by the composite cylindrical lens 22 that has a twin-lens that correspond to the obliquely emitted two laser fluxes, and forms a linear image at a single reflection point on the polygonal mirror of the deflector 3.

The laser fluxes reflected on the reflecting surface of the polygonal mirror surface are deflected for scanning. The laser fluxes are obliquely reflected in an upside-down relation on the reflecting surface and travel toward the first imaging lens 32 that is an f-theta lens. The laser fluxes for magenta M and yellow Y commonly pass through the first imaging lens 32 and are f-theta corrected. The laser flux for yellow Y passes through the second imaging lens 43, and travels toward the reflecting mirror 55. The optical path of the laser flux for yellow Y is turned at the reflecting mirror 55, and an image is formed on the photosensitive drum 64 for yellow Y.

The laser flux for magenta M is folded on the reflecting mirrors 56 and 57, and travels through the second imaging lens 44 toward the reflecting mirror 58. The optical path of the laser flux for magenta M is turned at the reflecting mirror 58, and an image is formed on the photosensitive drum 63 for magenta M.

As described above, in the exemplary embodiment, the two laser fluxes on both of the black K and cyan C side and the magenta M and yellow Y side pass through the common optical elements to the first imaging lenses. However, from the second imaging lenses and thereafter, each of the laser fluxes passes through the independent optical element. Accordingly, for example, if positions of the first imaging lenses are changed, the correlation of illumination fluxes between black K and cyan C or magenta M and yellow Y is not changed. However, if positions of the second imaging lenses are changed, the correlation of the illumination fluxes is changed because each of the second imaging lenses is independently provided.

In the exemplary embodiment, in the optical components provided in the optical box 1, the reinforcing members 4 and 5 are disposed near at least two pairs of the second imaging lenses 41 and 42, and 43 and 44 and fastened to the side walls of the optical box 1 by connecting (bridging) between the side walls. By forming a closed space surrounded by the bottom plate 1a and the sidewall 1b of the optical box 1, and the reinforcing members 4 and 5, torsional stiffness can be increased and the positional relations between the two pairs of second imaging lenses 41 and 42, and 43 and 44 become less changeable.

Further, if the temperature environment is changed within the range surrounded by the closed space because the linear expansion coefficients of the optical box 1 and the reinforcing members 4 and 5 are set to a substantially same value, deformation or warpage due to an expansion difference between the optical box 1 and the reinforcing members 4 and 5 is not generated, and the components show a deformation behavior as a same material. Accordingly, the positional relations between the second imaging lenses 41 and 42, and 43 and 44 are always maintained constant.

Further, the reflecting mirrors 51, 54, 55, and 58 are adjusted in the state that the reinforcing members 4 and 5 are mounted. Accordingly, if the cover 2 for dust prevention is mounted after the adjustment, the optical axes of each emitted flux are not deviated.

When the scanning optical apparatus is externally vibrated, if the optical box has a resonance frequency mode that corresponds to an excitation frequency, the imaging lenses and mirrors in the optical box vibrate and their dynamic relative positions are deviated. Then, color misregistration in images occurs. Because various external excitation frequencies exist, to increase a minimum frequency of the resonance frequency is generally effective for vibration control.

In the exemplary embodiment, according to a vibration simulation, the resonance frequency of a primary torsional mode in the optical box is increased by 13% when the reinforcing members are added. The resonance frequency of a secondary membrane vibration mode is increased by 19% when the reinforcing members are added, and the vibration-proof performance in an external vibration is improved.

As described above, the present invention can provide the scanning optical apparatus capable of adjusting the optical axes of the light fluxes emitted from the optical box while the strength in the upper surface portion of the optical box in the scanning optical apparatus is increased.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-137946 filed in May 24, 2007 which is hereby incorporated by reference herein in its entirety.

What is claimed:

1. A scanning optical apparatus comprising:
   a first light source configured to emit a first laser beam;
   a second light source configured to emit a second laser beam;
   a deflection unit including a plurality of reflecting surfaces and configured to be rotationally driven around a rotation axis, wherein the first laser beam and the second laser beam are incident on a same reflecting surface of the deflection unit, and the deflection unit deflects the first laser beam and the second laser beam so that a first photosensitive member is scanned with the first laser beam and a second photosensitive member is scanned with the second laser beam;
   a first reflecting mirror configured to reflect the first laser beam deflected by the deflection unit towards the first photosensitive member;
   a second reflecting mirror configured to reflect the second laser beam deflected by the deflection unit towards the second photosensitive member;
   an optical box in which the deflection unit, the first reflecting minor and the second reflecting minor are provided, the optical box including a first side wall, a second side wall, and a third side wall that connects the first side wall and the second side wall, the first reflecting mirror being provided closer to the third side wall than the second reflecting mirror, the first reflecting minor and the second reflecting minor being provided at adjustable angles in the optical box;
   a reinforcing member configured to connect the first side wall and the second side wall and disposed between the first reflecting mirror and the second reflecting minor, as viewed from a direction parallel to the rotation axis of the deflection unit; and
   a cover attached to the optical box while the reinforcing member connects the first side wall and the second side wall and configured to close the optical box, the first laser beam reflected by the first reflecting minor passing through a first region of the cover and the second laser beam reflected by the second reflecting mirror passing through a second region of the cover.

2. The scanning optical apparatus according to claim 1, further comprising:
   a third reflecting mirror configured to reflect the second laser beam deflected by the deflection unit towards the deflecting unit,
   wherein the second reflecting minor is disposed between the deflection unit and the third reflecting minor and reflects the second laser beam reflected by the third reflecting mirror towards the second photosensitive member, and wherein the reinforcing member connects the first side wall and the second side wall so as to cover the third reflecting mirror.

3. The scanning optical apparatus according to claim 1, wherein the first reflecting minor and the second reflecting mirror are provided along the third side wall in the optical box.

4. The scanning optical apparatus according to claim 1, wherein the reinforcing member, not fixed to the third side wall of the optical box, connects the first side wall and the second side wall.

5. The scanning optical apparatus according to claim 1, further comprising:
 a third light source configured to emit a third laser beam, the third laser beam being incident on another reflecting surface of the deflection unit different from the reflecting surface on which the first laser beam is incident and deflected by the deflection unit so that a third photosensitive member is scanned with the third laser beam;
 a fourth light source configured to emit a fourth laser beam, the fourth laser beam being incident on a same reflecting surface as the reflecting surface on which the third laser beam is incident and deflected by the deflection unit so that a fourth photosensitive member is scanned with the fourth laser beam;
 a fourth reflecting minor configured to reflect the third laser beam deflected by the deflection unit towards the third photosensitive member, the fourth reflecting mirror being provided in the optical box at an adjustable angle;
 a fifth reflecting minor configured to reflect the fourth laser beam deflected by the deflection unit towards the fourth photosensitive member, the fifth reflecting mirror being provided farther from a fourth wall that connects the first side wall and the second side wall than the fourth reflecting minor at an adjustable angle in the optical box; and an other reinforcing member, not being fixed to the forth side wall of the optical box, to connect the first side wall and the second side wall between the fourth reflecting minor and the fifth reflecting minor as viewed from a direction parallel to the rotation axis of the deflection unit.

6. The scanning optical apparatus according to claim 5, wherein the fourth reflecting mirror and the fifth reflecting mirror are provided along the fourth side wall in the optical box.

7. The scanning optical apparatus according to claim 5, wherein the third laser beam reflected by the fourth reflecting mirror passes through a third region of the cover and the fourth laser beam reflected by the fifth reflecting mirror passes through a fourth region of the cover.

8. The scanning optical apparatus according to claim 5, wherein the second reinforcing member, not being fixed to the fourth side wall of the optical box, connects the first side wall and the second side wall.

9. The scanning optical apparatus according to claim 5, further comprising:
 a sixth reflecting minor configured to reflect the fourth laser beam deflected by the deflection unit towards the deflection unit,
 wherein the fifth reflecting mirror is disposed between the deflection unit and the sixth reflecting mirror and reflects the fourth laser beam reflected by the sixth reflecting minor towards the fourth photosensitive member, and
 wherein the other reinforcing member connects the first side wall and the second side wall so as to cover the sixth reflecting mirror.

10. The scanning optical apparatus according to claim 1, wherein a material of the reinforcing member has a linear expansion coefficient substantially the same as a linear expansion coefficient of a material of the optical box,
 wherein deformation or warpage of the optical box or the reinforcing member due to thermal expansion difference does not occur.

* * * * *